3,330,785
ANIONIC POLYMERIZATION PROCESSES
Thomas Boyd, Des Peres, Mo., assignor to Monsanto Company, St. Louis, Mo., a corporation of Delaware
No Drawing. Continuation of application Ser. No. 226,452, Sept. 26, 1962. This application Aug. 23, 1965, Ser. No. 481,912
8 Claims. (Cl. 260—2.5)

ABSTRACT OF THE DISCLOSURE

There is disclosed a process for polymerizing anionically polymerizable vinylidene monomers wherein a solution of an ion radical adduct of an alkali metal and an organic compound in an inert ether is admixed with an inert liquid hydrocarbon to produce a catalyst dispersion of finely divided alkali metal in a liquid medium consisting of the inert liquid hydrocarbon, inert ether and the organic compound of the adduct. This catalyst dispersion of the finely divided alkali metal is then admixed with a solution of the vinylidene monomers in an inert liquid hydrocarbon to effect polymerization thereof.

This application is a continuation of my copending application Ser. No. 226,452, filed Sept. 26, 1962, now abandoned, which in turn is a continuation-in-part of my application Ser. No. 790,370, filed Feb. 2, 1959, now abandoned.

The invention relates to anionic polymerization processes and more particularly relates to the anionic polymerization of vinylidene monomers in the presence of certain novel catalyst dispersions.

It is known that vinylidene monomers having an electron-withdrawing group attached to the vinylidene group can be polymerized by anionic processes. Among the anionic catalysts which have been employed in such processes are alkali metals and ion-radical adducts, i.e., reaction products of alkali metals and organic compounds which react with alkali metals without loss of hydrogen. Processes catalyzed by alkali metals are normally considerably slower than processes catalyzed by ion-radical adducts, since it is difficult to reduce the particle size of the alkali metal sufficiently to provide the large surface area required for efficient polymerization and, even when sufficient reduction in particle size can be initially achieved, it is difficult to maintain the alkali metal in fine dispersion. Processes catalyzed by ion-radical adducts are very rapid but have the disadvantage of limiting the type of solvent in which the monomer can be dissolved, they are conducted only in polar solvents.

An object of the invention is to provide a novel anionic polymerization process.

Another object is to provide a process for polymerizing an anionically-polymerizable vinylidene monomer in the presence of a novel anionic catalyst dispersion.

A further object is to provide a rapid process for polymerizing an anionically-polymerizable vinylidene monomer by contacting a non-polar solvent solution of the monomer within an anionic catalyst.

These and other objects are attained by contacting (1) a solution of an anionically-polymerizable vinylidene monomer in an inert liquid hydrocarbon with (2) a catalyst dispersion which has been prepared by mixing an inert liquid hydrocarbon with a solution of an ion-radical adduct in an inert ether to decompose the ion-radical adduct and form a dispersion of finely-divided alkali metal in a medium consisting of the inert liquid hydrocarbon, the inert ether, and the organic residue of the ion-radical adduct.

The following examples are given to illustrate the invention and are not intended as a limitatioin thereof. Since all of the processes described in the examples must be conducted in the substantial absence of water, oxygen, carbon dioxide, and Lewis acids, the apparatus must be properly chosen and cleaned, the chemicals purified, and an inert atmosphere maintained in the apparatus throughout each of the processes to prevent the presence of any substantial amount of these contaminants.

Reference throughout the specification to the substantial absence of the aforementioned contaminants should be understood to indicate the presence of fewer equivalents of the contaminants than of ion-radical adduct or alkali metal, preferably not more than 10 equivalent percent of the contaminants, based on the number of equivalents of ion-radical adduct or alkali metal in the system.

Unless otherwise specified, quantities mentioned in the examples are quantities by weight.

EXAMPLE I.—PREPARATION OF CATALYST DISPERSIONS

Part A

Purge a suitable apparatus with nitrogen and charge it with 415 parts of ethylbenzene and 30 parts of a solution prepared by reacting an excess of sodium with about 1.3 parts of naphthalene in 100 parts of 1,2-dimethoxyethane to form a 1:1 adduct of sodium and naphthalene. Uniformly mix the ethylbenzene and the sodium naphthalene solution by bubbling nitrogen therethrough. The admixture results in the formation of a dispersion of finely-divided sodium in a medium consisting of ethylbenzene, 1,2-dimethoxyethane, and naphthalene, hereinafter designated as Catalyst Dispersion A.

Part B

Repeat Part A except for substituting 315 parts of hexane for the 415 parts of ethylbenzene. The product, Catalyst Dispersion B, is a dispersion of finely-divided sodium in hexane, 1,2-dimethoxyethane, and naphthalene.

Part C

Repeat Part A except for substituting 303 parts of pentane for the 415 parts of ethylbenzene. The product, Catalyst Dispersion C, is a dispersion of finely-divided sodium in pentane, 1,2-dimethoxyethane, and naphthalene.

EXAMPLE II

Separately charge (a) a solution of 26 parts of styrene in 125 parts of ethylbenzene and (b) 148 parts of Catalyst Dispersion A to a T-form mixing nozzle having 1 mm.-bore arms and a 2 mm.-bore stem, 5 mm. long. Inject the charges through the nozzle simultaneously over a period of 55–60 seconds at a uniform speed such that the sojourn time in the mixing nozzle is about 0.01 second. Add 5 parts of methanol to the effluent to deactivate the polymer. Then add the effluent to at least a ten-fold volume of methanol to precipitate polystyrene, and recover the polymer by filtration.

The process results in 99% conversion to a polystyrene having a Staudinger average molecular weight of 220,000 and an intrinsic viscosity of 0.838, measured in toluene at 25° C.

EXAMPLE III

Separately charge (a) a solution of 26 parts of styrene in 95 parts of hexane and (b) 115 parts of Catalyst Dispersion B to a T-form mixing nozzle having 1 mm.-bore arms and a 2 mm.-bore stem, 5 mm. long. Inject the charges through the nozzle simultaneously over a period of 55–60 seconds at a uniform speed such that the sojourn time in the mixing nozzle is about 0.01 second. Add 5 parts of methanol to the effluent to deactivate the polymer, and recover the polymer by filtration.

The process results in 95% conversion to a flocculant polystyrene having a staudinger average molecular weight of 180,000 and intrinsic viscosity of 0.75, measured in toluene at 25° C. When the flocculant polystrene is placed in boiling water, it expands to form a foamed structure having about three times the volume of the unexpanded polymer.

*Example IV*

Repeat Example III except for employing (a) a solution of 26 parts of styrene in 90 parts of pentane as the monomer charge and (b) 111 parts of Catalyst Dispersion C as the catalyst charge to the mixing nozzle.

The process results in 95% conversion to a flocculant polystyrene having a Staudinger average molecular weight of 180,000 and in intrinsic viscosity of 0.75, measured in toluene at 25° C. When the flocculant polystyrene is placed in boiling water, it expands to form a foamed structure having about three times the volume of the unexpanded polymer.

The process of the invention is an anionic polymerization process wherein a solution of an anionically-polymerizable vinylidene monomer in an inert liquid hydrocarbon is contacted with a catalyst dispersion which has been prepared by mixing an inert liquid hydrocarbon with a solution of an ion-radical adduct in an inert ether to decompose the ion-radical adduct and form a dispersion of finely-divided alkali metal in a medium consisting of the inter liquid hydrocarbon, the inert ether, and the organic residue of the ion-radical adduct.

Vinylidene monomers which can be polymerized in accordance with the present invention are those which are anionically polymerizable, i.e., monomers in which the vinylidene group is linked to an electron-withdrawing group, such as an organic radical containing ethylenic or aromatic unsaturation, a nitrile group, a nitro group, an ester group, an amide group, a carbonyl group, a sulfone group, etc. Groups which are electron-withdrawing rather than electron-releasing are, of course, obvious to the skilled chemist. Exemplary of utilizable monomers are vinyl aromatic hydrocarbons such as styrene, vinyl toluene, vinyl naphthalene, etc.; ar-alkoxy and ar-halo derivatives of vinyl aromatic hydrocarbons, e.g., o-, m-, and p-methoxystyrenes, o-, m-, and p-chlorostyrenes, etc.; conjugated dienes such as butadiene, isoprene, etc.; acrylic-type esters such as methyl acrylate, methyl methacrylate, etc.; acrylonitrile; methacrylonitrile; and mixtures thereof.

The inert liquid hydrocarbon in which the vinylidene monomer is dissolved can be, e.g., an aromatic hydrocarbon such as benzene, toluene, xylene, ethylbenzene, diphenyl, etc.; a cycloaliphatic hydrocarbon such as cyclohexane, methylcyclohexane, etc.; an alkane containing 2–30 carbon atoms, e.g., butane, pentane, hexane, octane, dodecane, etc.; an alkene which is non-polymerizable in the system, e.g., propene, butene, pentene, etc. Since the use of alkanes as solvents for the vinylidene monomers permits the formation of directly-foamable polymers, as demonstrated in Examples III and IV, their use constitutes one of the preferred embodiments of the invention. Particularly suitable alkanes are those containing 3–7 carbon atoms, e.g., propane, n-butane, iso-butane, n-pentane, iso-pentane, neo-pentane, the hexanes, and the heptanes.

The ion-radical adduct solutions which are employed in preparing the catalyst dispersions of the invention are already well known. Essentially, they are solutions in an inert ether (e.g., 1,2-dimethoxyethane, 1,2-diethoxyethane, tetrahydrofuran, dioxolane, a carbitol ether, a Cellosolve ether, dimethyl ether, diphenyl ether, methoxycyclohexane, etc.) of a 1:1 adduct of an alkali metal (i.e., Li, Na, K, Rb, or Cs) and an organic compound which reacts with alkali metals without loss of hydrogen (e.g., a fused-ring aromatic hydrocarbon such as napththalene, anthracene, phenanthrene, etc.; other polycyclic aromatic hydrocarbons such as di-, tri-, and tetraphenylethylenes, biphenyl, etc.; completely aromatic ketones such as benzophenone, etc.). These adduct solutions are prepared in an inert atmosphere in the substantial absence of water, oxygen, carbon dioxide, and Lewis acids by reacting an excess of alkali metal with the organic compound in the inert ether solvent.

For the purposes of the present invention, the preferred adduct solutions are those prepared by reacting the alkali metal with about 1–100 parts by weight of the organic compound in 100 parts by weight of the inert ether. Since the operability of the adduct solutions in preparing the catalyst dispersions of the invention is dependent on the type of linkage which exists between the alkali metal and organic components of all ion-radical adducts rather than on the particular chemical composition of the adduct, the particular nature of the organic component of the adduct is immaterial as far as utility of the adduct solutions is concerned. However, because of availability, the solutions of alkali metal/fused-ring aromatic hydrocarbons are especially preferred.

The catalyst dispersions of the invention are prepared by mixing an inert liquid hydrocarbon (e.g., any of the hydrocarbons mentioned above as suitable for use as monomer solvents) with an ion-radical adduct solution, preferably in such proportions that the dispersion contains at least 4, more preferably at least 20, parts by weight of inert liquid hydrocarbon per part of inert ether solvent. The admixture is accomplished without the addition of heat in an inert atmosphere in the substantial absence of water, oxygen, carbon dioxide, and Lewis acids. Ordinarily, atmospheric pressure conditions are suitable for the admixture, but superatmospheric pressure can be utilized when desired. When the inert hydrocarbon is normally gaseous at room temperature, sufficient pressure must be used to convert it to the liquid state. The admixture can be accomplished at any desired speed, with a decrease in the particle size of the dispersion resulting from an increase in the rate of mixing. A decrease in the particle size of the dispersion can also be effected by increasing the degree of dilution of the dispersion.

Polymerization is effected by contacting the monomer solution and catalyst dispersion in any suitable manner. The reaction is very rapid, substantially complete polymerization being accomplished in a few seconds. According to a preferred embodiment of the invention, the catalyst dispersion is one in which the inert liquid hydrocarbon component is the same as the inert liquid hydrocarbon employed as the monomer solvent.

The polymerization conditions and the concentrations of the constituents of the reaction mixture can be varied in manner known to the art for ease of operation, control of the molecular weight of the product, etc. Preferably, the polymerization is conducted at a temperature below the boiling point of the monomer solvent, usually in the range of −80 to 100° C., at atmospheric or superatmospheric pressure. The reaction mixture usually contains about 10–55% by weight of monomer, based on the total weight of inert liquid hydrocarbon, i.e., the combined weights of the monomer solvent and the inert liquid hydrocarbon component of the catalyst dispersion. The catalyst dispersion is usually employed in such amount that the reaction mixture contains not more than 5%, preferably about 0.2–1% by weight of the organic residue of the ion-radical adduct, based on the weight of the monomer being polymerized.

Advantageously, the polymerization is conducted by continuous process techniques. If desired, the molecular weight distribution of the product can be controlled to a narrow range by mixing the monomer solution and catalyst dispersion at a rate at least four times faster than the polymerization rate.

The invention is particularly advantageous in that it provides a means of accomplishing rapid, efficient anionic polymerization in a non-polar solvent while avoiding the preliminary difficulties associated with reducing bulk alkali metal to a sufficiently small particle size to effect rapid polymerization and maintaining the alkali metal in fine dispersion. Among the advantages of being able to conduct the polymerization in a non-polar solvent are (1) obviation of the need to purify styrene of contaminating ethyl-benzene prior to polymerization and (2) the ability to form directly foamable polymers by employing an alkane which serves the dual function of monomer solvent and pneumatogen.

It is obvious that many variations can be made in the products and processes set forth above without departing from the spirit and scope of this invention.

What is claimed is:

1. A process for polymerizing an anionically-polymerizable vinylidene monomer of the group consisting of a vinyl aromatic hydrocarbon, an ar-alkoxy vinyl aromatic hydrocarbon, an ar-halo vinyl aromatic hydrocarbon, a conjugated diene, methyl acrylate, methyl methacrylate, acrylonitrile methacrylonitrile, and mixtures thereof which comprises (1) admixing a solution of an ion radical adduct of an alkali metal and an organic compound of the group consisting of a fused-ring aromatic hydrocarbon, diphenylethylene, triphenylethylene, tetraphenylethylene, biphenyl, and benzophenone in an inert ether with an inert liquid hydrocarbon to produce a catalyst dispersion of a finely divided alkali metal in a medium consisting of said inert liquid hydrocarbon, inert ether and organic compound; and (2) contacting said catalyst dispersion with a solution of the anionically-polymerizable vinylidene monomer in an inert liquid hydrocarbon.

2. The process of claim 1 wherein the ion-radical adduct is a 1:1 adduct of an alkali metal and a fused-ring aromatic hydrocarbon.

3. A polymerization process which comprises admixing (1) a solution of an iron radical adduct comprising sodium naphthalene in 1,2-dimethoxyethane with an inert liquid hydrocarbon in an amount of at least 4 parts by weight of the inert liquid hydrocarbon per part of 1,2-dimethoxyethane to produce a catalyst dispersion of finely divided sodium in a medium consisting of an inert liquid hydrocarbon, 1,2-dimethoxyethane and naphthalene; and (2) contacting said catalyst dispersion with a solution of styrene in an inert liquid hydrocarbon.

4. The process of claim 3 wherein the inert liquid hydrocarbon in steps (1) and (2) is ethylbenzene.

5. The process of claim 3 wherein the inert liquid hydrocarbon in steps (1) and (2) is an alkane containing 3 to 7 carbon atoms.

6. The process of claim 5 wherein the alkane is pentane.

7. The process of claim 5 wherein the alkane is hexane.

8. A process which comprises preparing polystyrene by the process of claim 5 and expanding the polystyrene to a foam-like structure by the application of heat.

References Cited
UNITED STATES PATENTS

| | | | |
|---|---|---|---|
| 2,681,321 | 6/1954 | Stastny et al. | 260—2.5 |
| 2,980,661 | 4/1961 | Twaddle et al. | 260—93.5 |
| 3,029,221 | 4/1962 | Welch | 260—93.5 |
| 3,041,312 | 6/1962 | Boyd | 260—93.5 |
| 3,069,405 | 12/1962 | McCormick et al. | 260—93.5 |

MURRAY TILLMAN, *Primary Examiner.*

J. C. BLEUTGE, *Assistant Examiner.*